April 13, 1926. 1,580,642
J. BINDER
MACHINE FOR MANUFACTURING BOTTLE CLOSURES
Filed Feb. 19, 1925 9 Sheets-Sheet 1

Fig. 1.

INVENTOR
John Binder
BY
Sigmund Herzog
ATTORNEY

April 13, 1926. 1,580,642
J. BINDER
MACHINE FOR MANUFACTURING BOTTLE CLOSURES
Filed Feb. 19, 1925  9 Sheets-Sheet 2

Fig. 2.

INVENTOR
John Binder
BY
Sigmund Herzog
ATTORNEY

April 13, 1926.　　　　　　　　　　　　　　1,580,642
J. BINDER
MACHINE FOR MANUFACTURING BOTTLE CLOSURES
Filed Feb. 19, 1925　　　9 Sheets-Sheet 4

INVENTOR
John Binder
by Sigmund Herzog
ATTORNEY

April 13, 1926.

J. BINDER 1,580,642

MACHINE FOR MANUFACTURING BOTTLE CLOSURES

Filed Feb. 19, 1925   9 Sheets-Sheet 6

INVENTOR
John Binder
BY
Sigmund Herzog
ATTORNEY

April 13, 1926.  1,580,642

J. BINDER

MACHINE FOR MANUFACTURING BOTTLE CLOSURES

Filed Feb. 19, 1925   9 Sheets-Sheet 7

INVENTOR
John Binder
BY Sigmund Herzog
ATTORNEY

April 13, 1926.　　　　　　　　　　　　　　1,580,642
J. BINDER
MACHINE FOR MANUFACTURING BOTTLE CLOSURES
Filed Feb. 19, 1925　　　9 Sheets-Sheet 8

Fig. 12.

INVENTOR
John Binder
BY
Sigmund Herzog
ATTORNEY

April 13, 1926. 1,580,642
J. BINDER
MACHINE FOR MANUFACTURING BOTTLE CLOSURES
Filed Feb. 19, 1925    9 Sheets-Sheet 9

INVENTOR
John Binder
BY
Sigmund Herzog
ATTORNEY

Patented Apr. 13, 1926.

1,580,642

UNITED STATES PATENT OFFICE.

JOHN BINDER, OF NEW HYDE PARK, NEW YORK, ASSIGNOR, BY MESNE ASSIGNMENTS, TO NEW PROCESS CORK COMPANY, INC., OF BROOKLYN, NEW YORK, A CORPORATION OF NEW YORK.

MACHINE FOR MANUFACTURING BOTTLE CLOSURES.

Application filed February 19, 1925. Serial No. 10,314.

*To all whom it may concern:*

Be it known that I, JOHN BINDER, a citizen of the United States, and resident of New Hyde Park, in the county of Queens and State of New York, have invented certain new and useful Improvements in Machines for Manufacturing Bottle Closures, of which the following is a specification.

The present invention relates to a machine for the manufacture of closures for bottles or like receptacles, and more particularly it pertains to a machine for making closures of the cap variety, including those termed "crown corks". Closures of this type consist of a metallic cap or crown, to be locked to the exterior of the neck of the bottle or other container, and of a sealing disk or packing of cork or the like, which is united by the aid of a suitable cementing medium with the cap or crown.

The main object of the present invention is to provide a simple and efficient means for feeding the metallic caps or crowns to the assembling mechanism of the machine.

Another object of the invention is to construct a mechanism whereby the feeding of sealing disks is prevented to the assembling mechanism whenever a cap or crown has not been previously placed thereonto.

A further object of the invention is to produce a simple and efficient mechanism for ejecting the finished product from the machine.

A still further object of the invention is to provide the machine with a carrier, onto which the finished product is ejected by the mechanism above referred to.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figures 13, 14:
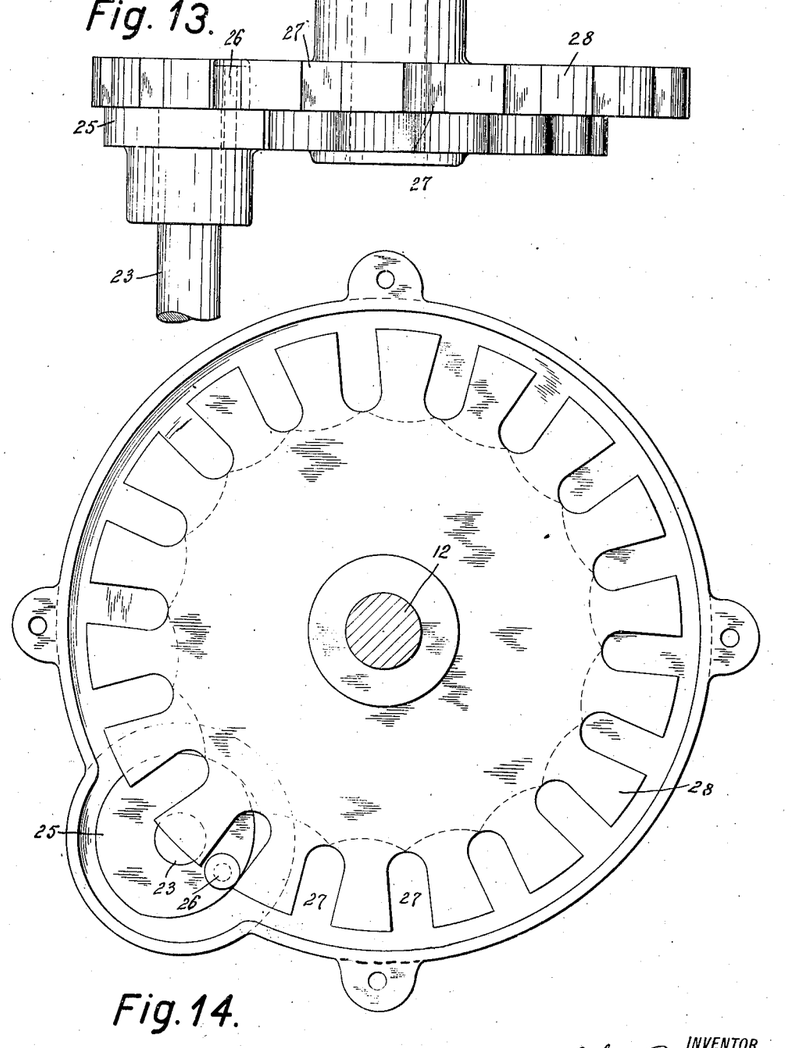
Fig. 13 is a side elevation of the mechanism for imparting step by step rotary movement to an element of the assembling mechanism of the machine.
Fig. 14 is a top elevation thereof.

The machine herein described is of the type of the one disclosed in U. S. Letters Patent No. 1,381,055, granted to me on June 7, 1921. This machine uses a liquid or viscous cementing material, which is caused to coagulate by heat. The machine comprises a frame 10, including a horizontal table portion 11. In the frame is rotatably mounted a vertically extending shaft 12, to which is fixedly attached a transporting wheel 13. The peripheral portion of this transporting wheel is made of two sections 14 and 15, which are fixed to one another in any suitable manner, the section 14 underlying the annular portion 11' of the table 11 and the section 15 overlying the same. In the portions 14 and 15 of the transporting wheel are formed equidistantly spaced recesses 16 and 17, respectively, the recesses 16 registering with the recesses 17. To the recesses 16 are fed the metallic caps of the closures in their inverted positions in a manner hereinafter to be described. The transporting wheel is intermittently rotated in the direction of the arrow shown in Fig. 2 of the drawings from a main driving shaft 18. This shaft is journaled in bearings 19 on the frame 10, and has keyed or otherwise attached to it a gear 20, in mesh with a pinion, not shown, of a motor, or the said driving shaft may be driven in any other suitable manner by any suitable source of power. The connection between the shafts 18 and 12 may be of any suitable type, for instance there may be fixed to the shaft 18 an oblique toothed gear 21, in mesh with a similar gear 22 on a shaft 23, the latter being journaled in bearings 24 and carrying a disk 25. This disk is provided with a pin 26, adapted to coact with radially extending peripheral recesses 27 in a disk 28, the latter being attached to the shaft 12, (Figs. 13 and 14), and serves to convert the continuous rotary motion of the shaft 23 into intermittent motion of the shaft 12. Since this mechanism does not form part of the present invention, a further detailed description of the same seems to be unnecessary.

Figure 4:
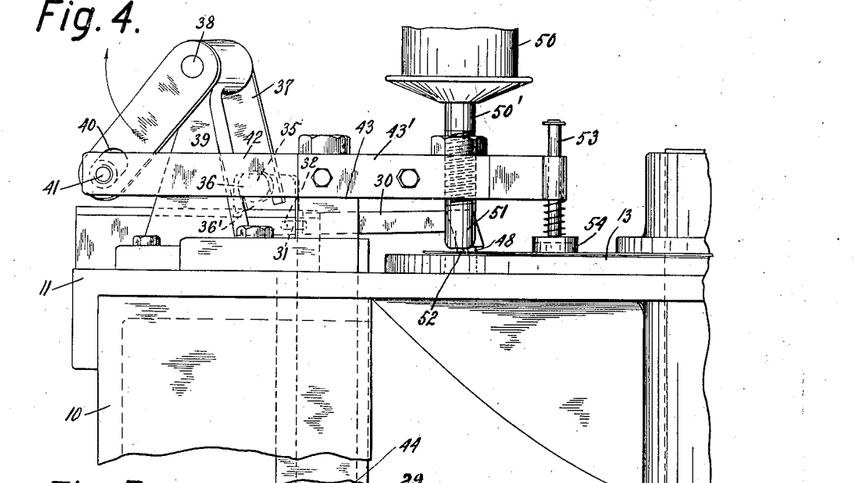
Fig. 4 is a rear elevation, on a larger scale, of the mechanism for feeding the metallic caps or crowns to the assembling mechanism of the machine.
Figure 5:
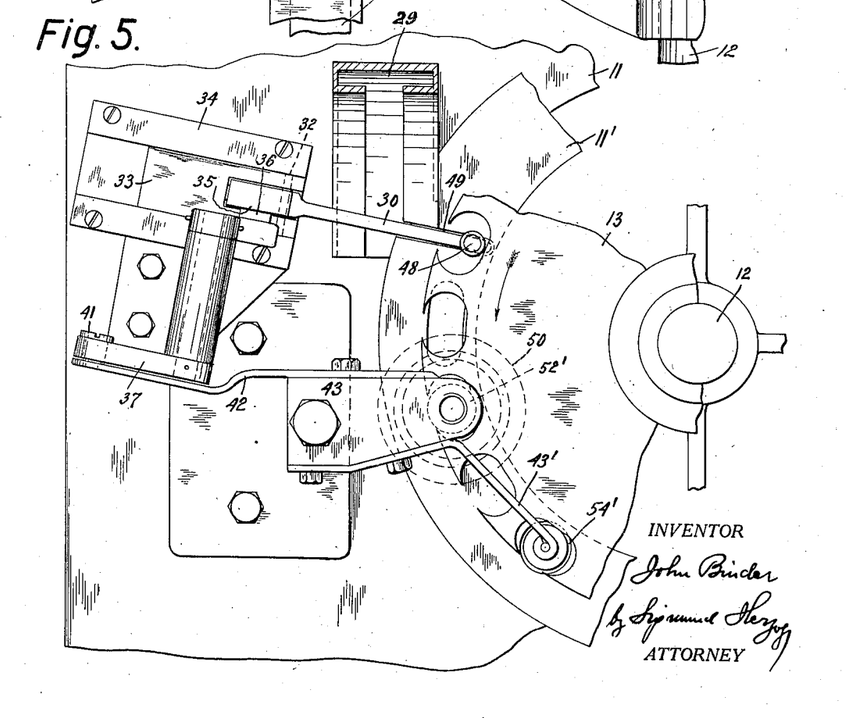
Fig. 5 is a top plan view thereof.

The metallic caps are passed to the recesses 16 in the transporting wheel 13 through a charging chute 29, leading to the inner periphery of the ring-shaped table portion 11' (Figs. 4 and 5). The mechanism which takes hold of the caps, as they issue from the chute 29 and conveys the same to the transporting wheel, includes a finger 30 which is provided at its inner end with a slot 31, through the said slot extending a pin 32, the latter being carried by a slide 33. This slide is reciprocably arranged in guides 34 on the table portion 11. On an upwardly projecting lug 35 of the finger 30 is mounted a pin 36, seated in a slot 36' of a bell-crank lever 37, the latter being fulcrumed at 38 to a standard 39 on the table portion 11. The other arm of the said bell-crank lever is provided with a slot 40, into which is extended a pin 41 of an arm 42, that is fixed to a bracket 43, having a downwardly projecting vertical extension 44. This extension is vertically slidable on the frame 10 and connected to a rod 45, the other end of which is fixed in the usual manner to the strap 46 of an eccentric 47, the latter being keyed to the driving shaft 18. The eccentric 47 and the driving mechanism 25, 26, 27 and 28 are so timed that, during the downward stroke of the bracket 43, the transporting wheel 13 is at rest, and a closure cap held in registering position at the outlet of the chute 29 with one of the recesses 16 in the said transporting wheel. The finger 30 is provided with a downwardly projecting lug 48 upon its outer end. This finger is adapted to move in a slot 49 in the annular section 11' of the table 11 of the frame, and this finger is adapted to engage a closure cap when the same arrives at the outlet of the chute 29. As shown in Figs. 4 and 5 of the drawings, the slide 33 and finger 30 are in their inner positions, the finger having just transported a closure cap from the chute to one of the recesses in the transporting wheel 13. In these positions of the elements mentioned the bracket 43 is in its lowermost position. When thereafter the said bracket is raised by the eccentric 47 and the elements co-operating therewith, the bell-crank lever 37 swings in the direction of the arrow shown in Fig. 4 of the drawings, whereby the finger 30 is caused to swing on the pin 32 upwards and thereafter with the slide 33 outwards. The lug 48 on the finger 30 is thus brought into alignment with a closure cap at the outlet of the chute 29. In the meantime the transporting wheel 13 moves through an annular distance corresponding to the distance between two recesses 16 therein, thereby bringing the next recess in the series in alignment with the outlet of the chute 29. When the transporting wheel comes to a stop, on the downward stroke of the bracket 43 the lug 48 is engaged with a closure cap at the outlet of the chute 29, the said cap being carried into a recess 16 as the finger 30 moves toward the transporting wheel.

Figure 2:
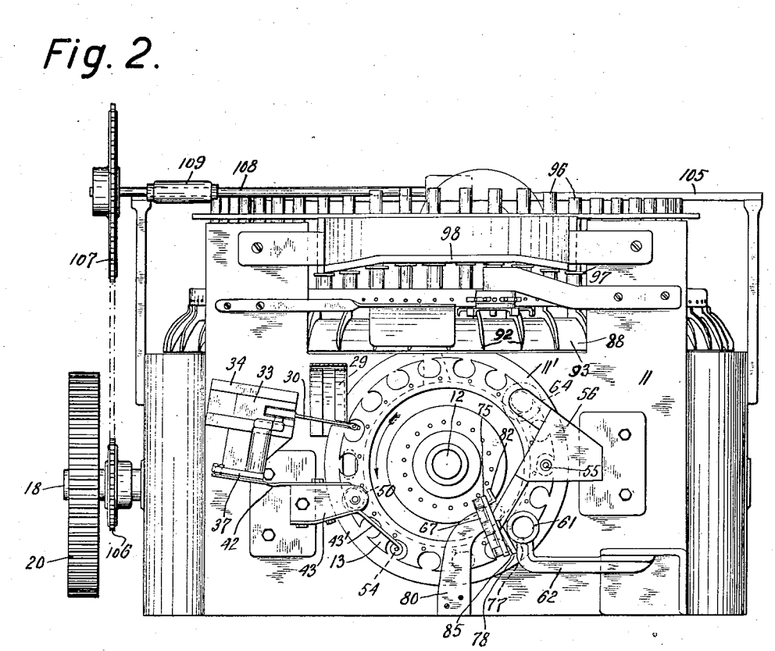
Fig. 2 is a top plan view thereof.
Figure 3:
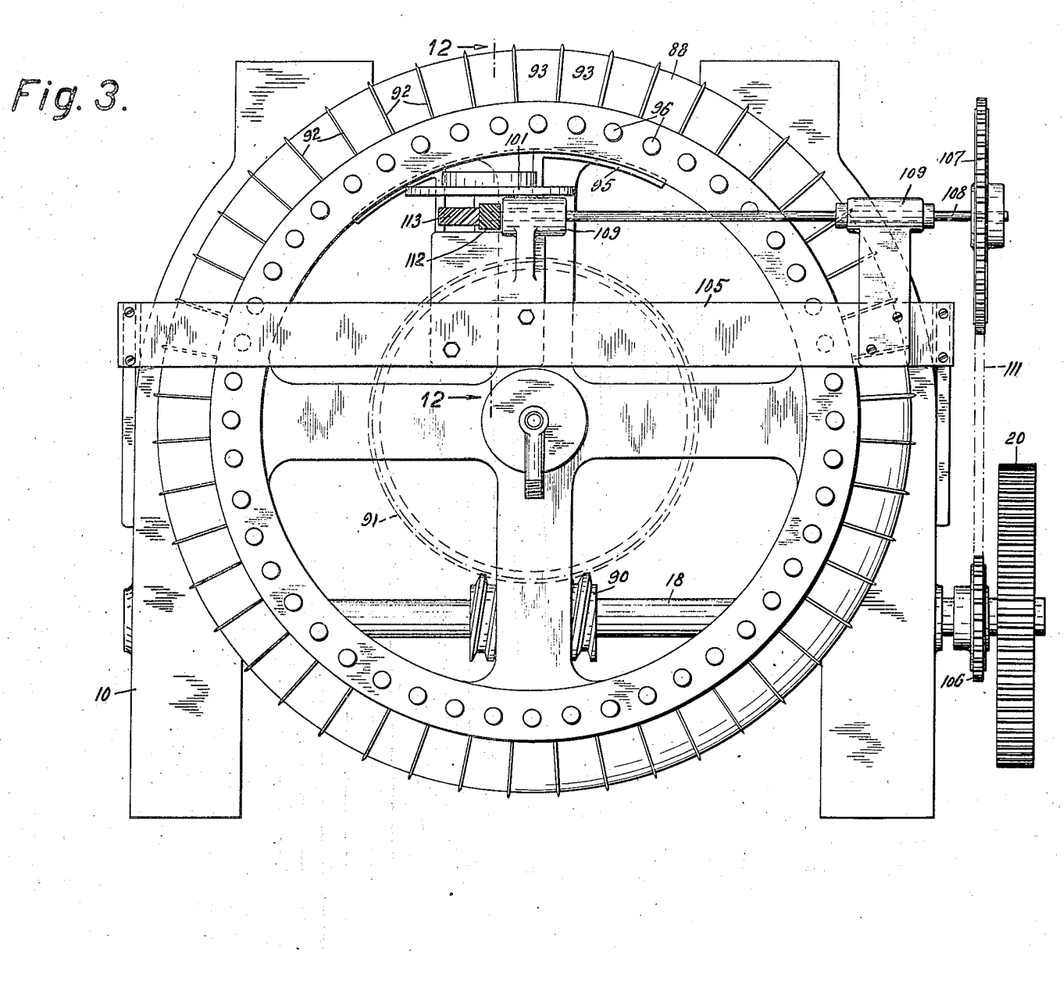
Fig. 3 is a front elevation, on a larger scale, of the heat and pressure applying drum of the machine, showing the same in operative relation to other elements.

The closure caps are transported, step by step, by the transporting wheel in the direction of the arrow shown in Figs. 2 and 5 of the drawings, and are brought, one after the other, into registering position with the means which introduces into the same the cementing material. This means comprises a receptacle 50, communicating through a pipe 50' with a valve casing 51. The receptacle 50, pipe 50' and valve casing 51 are carried by the bracket 43. Within the valve casing 50 is disposed a valve, not shown, it being fully disclosed in U. S. Letters Patent No. 1,249,714. To this valve is attached a pin 52, that projects below the valve casing and extends through the discharge opening in the latter. On the downward stroke of the bracket 43, the pin 52 projects through an opening 52' in the table portion 11' and is caused to bear against the inner face of a closure cap, whereby the valve is lifted from its seat and the desired amount of liquid cementing medium is introduced into the cap. Upon the upward stroke of the bracket 43, the valve is seated by means not shown.

The cementing material having been introduced into the cap, the latter is transported to means which spreads the cementing material over the entire surface of the cap. This means comprises, in the case illustrated in the drawings, a spring-pressed spindle 53, which is slidably mounted on an extension 43' of the bracket 43. To the lower end of this spindle is attached a block 54, for instance of felt. The reciprocating bracket 43, on its downward movement, brings the block 54 through an opening 54' in the table portion 11' into contact with the inner face of the cap and spreads the liquid cementing material over the entire inner face of the head thereof. On the upward movement of the bracket, the block 54 leaves the cap.

After the cementing material has been spread, the cap is transported to an assembling plunger 55, that is attached to a bracket 56, having a downwardly projecting vertical extension 57 slidably mounted in the frame 10 and connected by a rod 58 with the strap 59 of an eccentric 60, the latter being fixed to the driving shaft 18. The sealing disks are stacked in a vertical tube 61, which is supported by a bracket 62 on the table portion 11. These disks are fed by gravity into the recesses 17 in the upper portion 15 of the transporting wheel and are brought, one after the other, into alinement with the assembling plunger 55, which, in its downward movement, forces a sealing disk through a hole 63 in the table portion 11' into the metallic cap on top of the cementing material therein. Obviously, the eccentric 60 must be so timed in relation to the driving mechanisms 25, 26, 27 and 28 that the plunger moves downwards while the transporting wheel 13 is at rest and holds a cap in alinement with the said plunger. From this plunger the assembled closures are fed, one after the other, to a mechanism by which a predetermined quantity of paraffin or similar material is applied to the exposed face of the sealing disk. This mechanism comprises a container 64, provided with a valve mechanism 65 of the type described in connection with the cementing material applying device above referred to, the arrangement being such that when the bracket 56 moves downwards the pin 65' of the valve mechanism 65 is lowered through a hole 66 in the table portion 11' into contact with a closure, whereby the valve is unseated and a predetermined quantity of paraffin or like material is deposited on top of the assembled closure. It is obvious that the container 64 must be heated in order to keep the paraffin in liquid state. This heating means has not been shown as it does not form part of the present invention.

Figure 1:
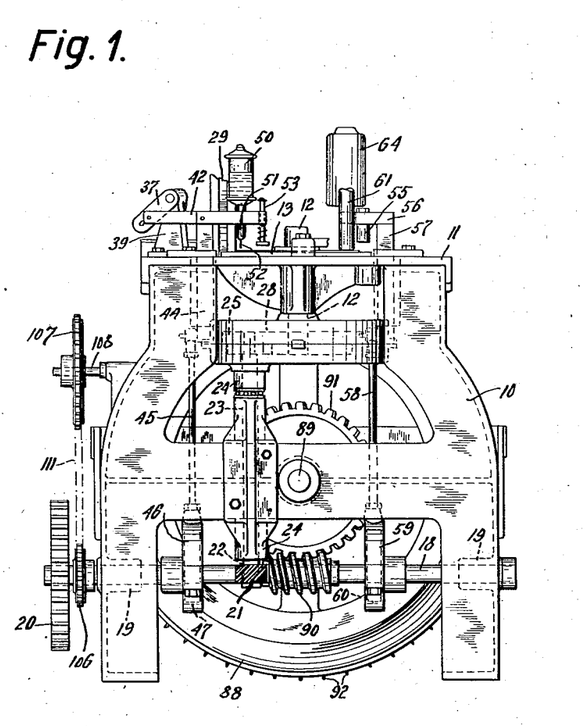
Figure 1 is a rear elevation of the improved machine.

With the tube 61 co-operates a mechanism which prevents feeding of a sealing disk into a recess 17 in the upper portion 15 of the transporting wheel when the recess 16 in the lower portion of the said transporting wheel in front of the last mentioned recess 17 does not contain a metallic cap. This mechanism is illustrated in detail in Figs. 6 and 7 of the drawings and comprises a bracket 67, fixed to the bracket 56 above referred to. Through the bracket 67 extends slidably a vertical spindle 68, which is adapted to be lowered in a manner hereinafter to be described through a hole 69 in the table portion 11' into a metallic cap when the latter is brought to rest in alinement with the said hole. At its upper end this spindle is provided with a head 70, that is adapted to bear against the bracket 67. Intermediate its ends, the spindle is provided with a stop 71 for a purpose hereinafter to be described. Through the bracket extends furthermore slidably a vertical spindle 72, having at its upper end a head 73. Between this head and the bracket is interposed a spring 74, which has a tendency to raise the spindle 72. With the heads 70 and 73 co-operates a lever 75, fulcrumed at 76 to the bracket 67. Above the transporting wheel is mounted a blade 77 on a lever 78, the latter having a vertical pivot pin 79 extending through a bracket 80. This bracket is fixed to the table portion 11 of the machine. The blade 77 is of a thickness that it fits between the outlet of the cork tube 61 and the transporting wheel 13, the said tube terminating a distance above the said transporting wheel, as clearly shown in Fig. 1 of the drawings. The lever 78 is provided at its inner end with a projection 82, with which is adapted to co-operate a plurality of equidistantly spaced pins 83 on the transporting wheel 13. To the lever 78 is attached by a horizontal pivot 84 a lever 85. The outer end of this last-mentioned lever is disposed in the path of the stop 71 on the spindle 68, and the inner portion 86 of the said lever in the path of the spindle 72, when the said lever is in the position shown in full lines in Fig. 6 of the drawings. When the outer end of the lever 85 is in the position shown in full lines in Fig. 7 of the drawings, it is disposed in the path of a plurality of equidistantly spaced pins 87 on the transporting wheel 13.

Figures 6, 7:
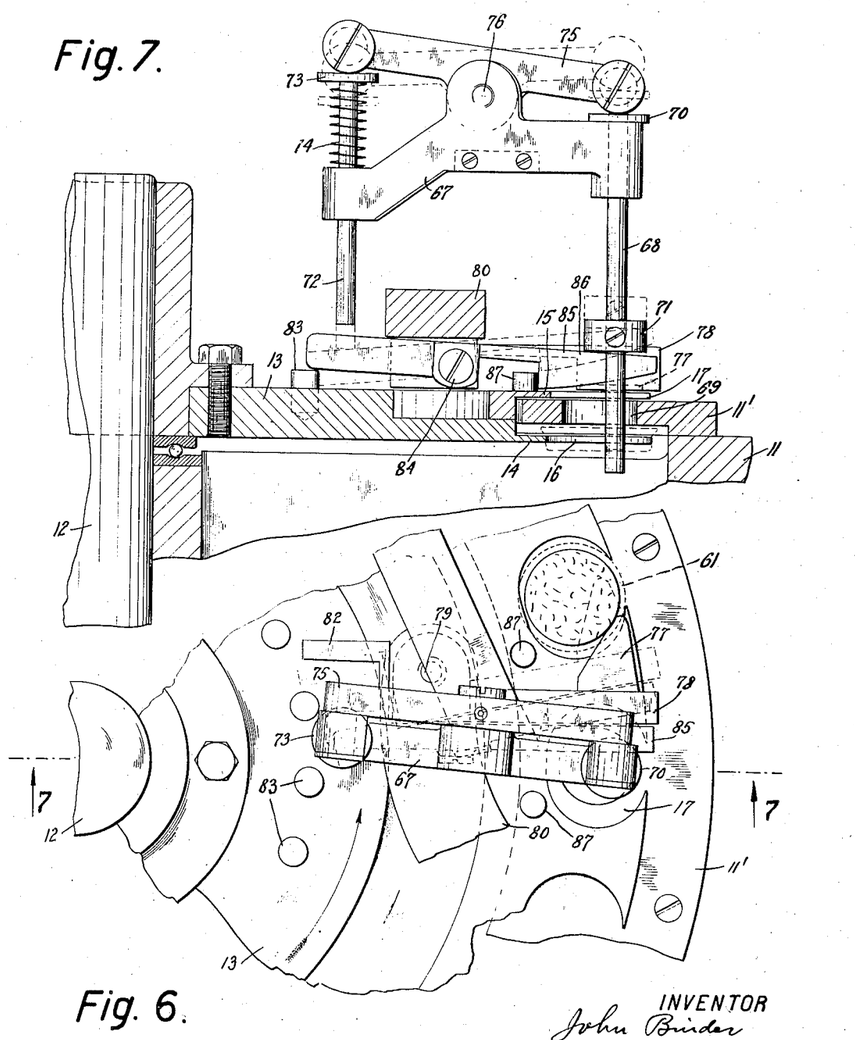
Fig. 6 is a top plan view, on a larger scale, of the means for preventing feeding of sealing disks to the assembling mechanism whenever a metallic cap or crown has not been previously placed thereonto.
Fig. 7 is a section taken on line 7—7 of Fig. 6.

Let us assume that the elements are in the positions shown in full lines in Fig. 6 of the drawings, in which the blade 77 is withdrawn from the cork tube 61. In this case, when a recess 17 in the transporting wheel arrives below the said cork tube, the lowermost of the packing disks drops into the said recess on top of the table portion 11', and is carried by the transporting wheel to the hole 63 in the table portion, to be forced by the plunger 55 into a closure cap held below the said hole. The outer end of the lever 85 is then in its raised position shown in dotted lines in Fig. 7 of the drawings, that is to say out of the path of the pins 87, and the extension 82 of the lever 78 is also disposed outside of the path of the pins 83. If now a recess 16 in the transporting wheels arrives empty below the hole 69 in the table portion 11', the spindle 68 is permitted, on the downward stroke of the bracket 67, to extend so far through the recesses 16 and 17 in the transporting wheel, in alignment with the hole 69, that the stop 71 shifts the lever 85 around its pivot pin 84 into the position shown in full lines in Fig. 7 of the drawings, in which the said lever is disposed in the path of the pin 87 immediately in rear of it. At the next movement of the transporting wheel the last-mentioned pin 87 shifts the lever 85 and the lever 78 on the pivot pin 79 into the dotted position shown in Fig. 6 of the drawings, in which the blade 77 is interposed between the outlet of the cork tube 61 and the transporting wheel. Therefore, at the next partial rotation of the transporting wheel a packing disk is prevented from entering the next recess 17, in the series, in the transporting wheel, so that the same will arrive empty at the hole 63 in the table portion 11' at the time the empty recess 16 in the transporting wheel registers with the said hole. When the blade 77 is interposed between the outlet of the cork tube and the transporting wheel, the extension 82 of the lever 78 is disposed in the path of the pins 83, as shown in dotted lines in Fig. 6 of the drawings. The transporting wheel will, therefore, at its next partial rotation return the elements into the positions shown in full lines in Fig. 6 of the drawings, the lever 85 being swung into the position shown in dotted lines in Fig. 7 of the drawings by the spring-pressed spindle 72. Whenever a closure cap is contained in a recess 16 in alignment with the hole 69 in the table portion, the spindle 68 cannot extend far enough through the said hole so as to bring the stop 71 into the action upon the lever 85. The elements, therefore, remain in the positions shown in full lines in Fig. 6 of the drawings. A packing disk is thus permitted to enter a recess 17 in the transporting wheel when it is in alignment with the tube 61. The spring 74 on the spindle 72 serves to cause, by the intermediary of the lever 75, a downward movement of the spindle 68 so as to bring the head 70 of the latter in abutment with the bracket 67 on the downward movement of the bracket 62.

The assembled crowns are brought, in a manner hereinafter to be described, onto a heating and uniting drum 88. This drum is mounted a slight distance below the transporting wheel 13, it being attached to a horizontally extending shaft 89, which is suitably journaled in bearings on the frame 10. This shaft is continuously driven from the main driving shaft, and for this purpose the latter is provided, for instance, with a worm 90, meshing with a worm gear 91, which is fixedly attached to the shaft 89. On the drum is formed a suitable number of radially extending ribs 92, whereby a plurality of curved passages 93 is formed in the drum, the said passages registering, as the drum rotates, with an inclined passage 94 in the table portion 11, and receiving thus, one after the other, assembled crowns from the passage 94, the crowns being discharged from the transporting wheel 13 into the passage 94. The crowns are arrested in their downward motion in the passage 93 by a stationary arc-shaped platform 95. Spring-pressed plungers 96 are slidably arranged in the drum in alignment with the passages 93, said plungers being disposed parallel to the longitudinal axis of the shaft 89 and carrying lugs 97, which are adapted to co-act with a cam 98, the latter being attached to the table portion 11. Upon each plunger is coiled a spring 99, having a tendency to force the same into the respective passage 93. The cam 98 is disposed in the path of the lugs 97 on the plungers, whereby, as the drum rotates, the plungers are forced, against the action of their springs, out of the passages 93, before they arrive opposite the passage 94. When a passage 93 arrives at this point, an assembled crown cork slides into the same and rests upon the platform 95. When the lugs of a plunger are disengaged from the cam, the respective spring forces the plunger against the respective crown cork, thereby placing the crown cork under compression and holding the same in this position until the closure makes nearly a complete revolution around the shaft 89, that is to say, until the plunger again arrives at the cam 98 and is disengaged from the closure. When this occurs, the closure slides down an inclined passage 100 in the platform 95 onto a horizontally disposed disk 101.

While the closures are being carried by the drum and held under pressure, their cementing material is coagulated or set by suitable heating means. For this purpose a suitable fluid, for instance steam, is admitted into an annular channel 102 in the drum. The temperature of the fluid is maintained at a point sufficient to coagulate or set the cementing material within the assembled closures. The coagulation results in a firm union between the parts of the closures. It is to be noted that, inasmuch as the plungers 96 are hot, the paraffine or similar material, which has been applied to the exposed faces of the packing disks, is spread over the exposed faces of the disks while the closures are held under compression on the drum.

The disk 101 is fixed to a spindle 103, journaled in a bearing 104, the latter being attached to a bridge member 105 on the machine frame. The disk 101 is continuously rotated, for instance, from the driving shaft 18. For this purpose there is fixed to the latter a sprocket wheel 106, in alignment with a sprocket wheel 107 on a shaft 108. The shaft 108 is journaled in bearings 109 on the bridge 105. Over the sprocket wheels runs a sprocket chain 111. Oblique toothed gears 112 and 113 on the shaft 108 and spindle 103, respectively, transmit the rotation of the shaft 108 to the spindle 103. The finished crown corks are carried by the disk 101 to a conveyor, not shown, to be examined while on the said conveyor by the attendant of the machine.

Figure 8:
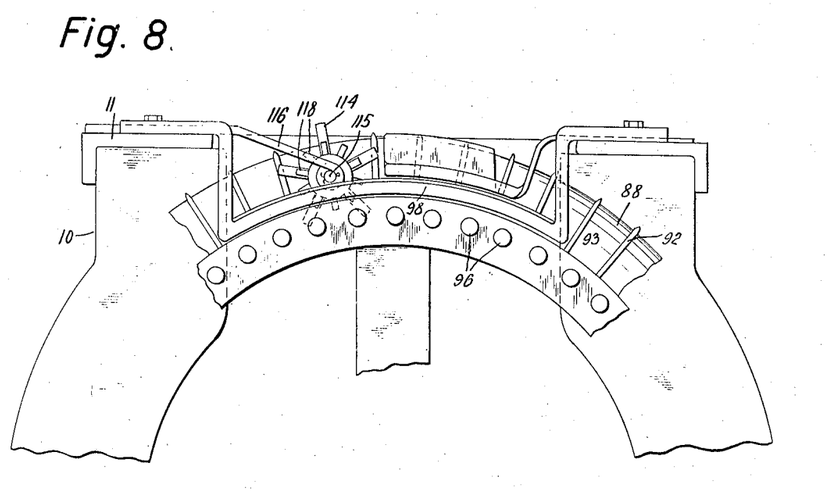
Fig. 8 is a front elevation, on a larger scale, of a portion of the heating and pressure applying drum and the ejecting mechanism co-operating therewith.
Figure 9:
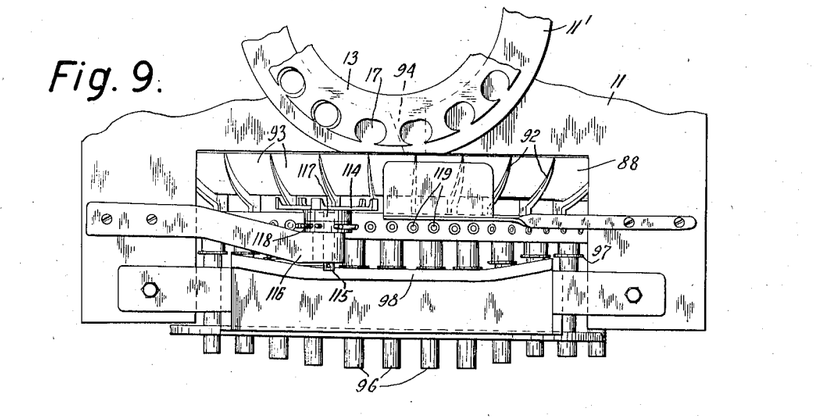
Fig. 9 is a top elevation of the detail shown in Fig. 8.
Figure 10:
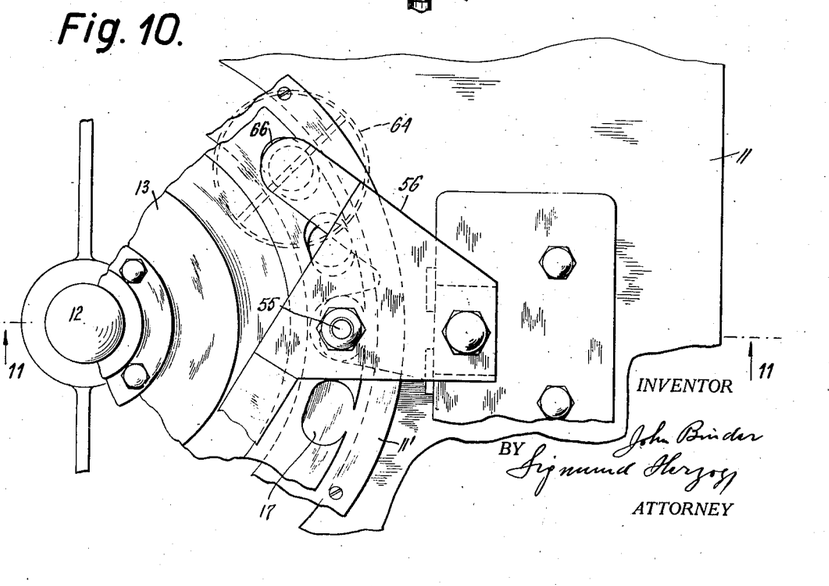
Fig. 10 is a top elevation, on a larger scale, of one of the elements of the assembling mechanism.
Figure 11:
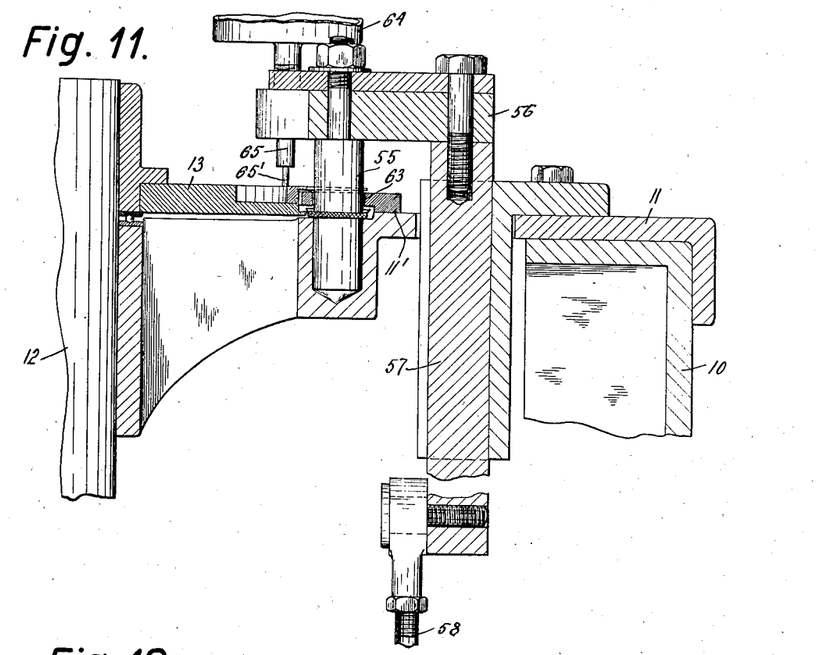
Fig. 11 is a section taken on line 11—11 of Fig. 10.
Figure 12:
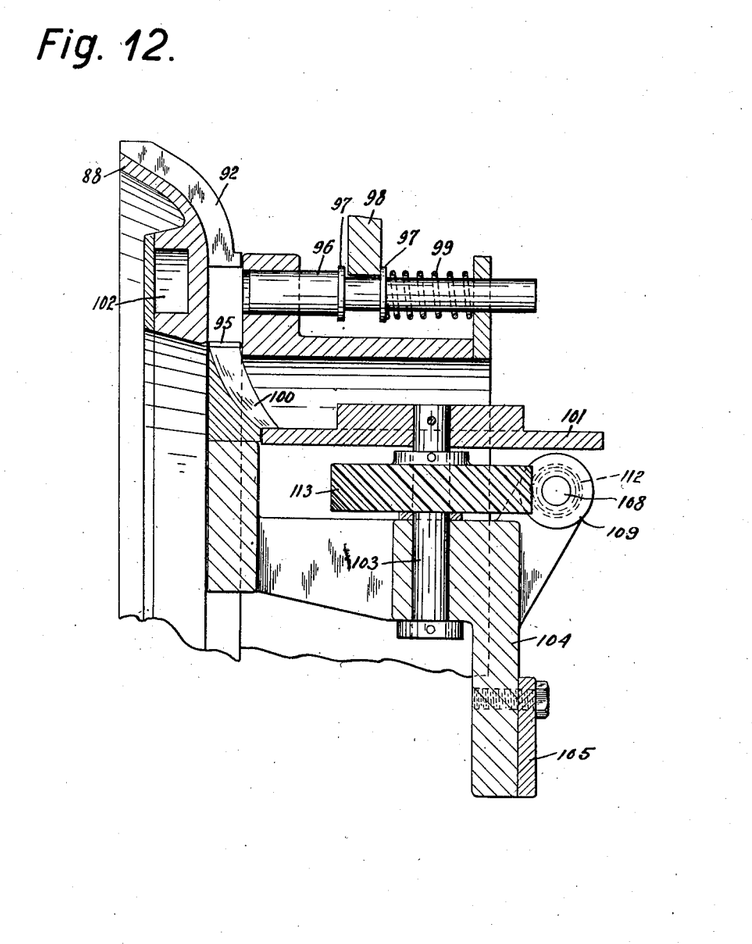
Fig. 12 is a section taken on line 12—12 of Fig. 3, on a larger scale.

It happens sometimes that the closures, while they are carried by the drum, adhere to the latter, so that, when they arrive opposite the passage 100, they do not slide into the same. In order to cause a disengagement of the closures from the drum, an ejecting mechanism is provided. This mechanism comprises a star wheel 114 (Figs. 8 and 9), mounted upon a spindle 115, the latter being journaled in a bearing 116, attached to the table portion 11. The arms of this star wheel, in their rotation, are projected into the passages 93 in the drum and eject the finished closures from the said passages. The star wheel is actuated in unison with the drum by the latter. For this purpose there are attached to the hub 117 of the star wheel a plurality of radial lugs 118, which are adapted to mesh with equidistantly disposed notches 119 in the drum. As the drum is rotated, the notches 119 in mesh with the lugs 118 impart rotary movement to the star wheel 114, causing its arms to project into the passages 93 in the drum and thereby eject the finished closures from the said passages.

What I claim is:—

1. In a machine for the manufacture of bottle closures of the cap variety, the combination with an intermittently moving cap transporting mechanism, of a chute for the caps in operative relation thereto, a reciprocable member, a slide, a finger pivoted to said slide, and a bell-crank lever in engagement with said finger and said reciprocable member for causing said finger to convey a cap from said chute to said transporting mechanism during each period of rest of the latter.

2. In a machine for the manufacture of bottle closures of the cap variety, the combination with an intermittently moving cap transporting mechanism having a plurality of equidistantly spaced recesses, each adapted to receive a cap, a stationary tube containing sealing disks adapted to be deposited into said caps, a blade movable on a vertical pivot capable of being interposed between the outlet of said tube and said transporting mechanism, a reciprocable member, spring-pressed means on said reciprocable member adapted to enter the notches in said transporting mechanism when the latter is at rest, a lever movable on a horizontal pivot on said blade, two sets of equidistantly spaced pins on said transporting mechanism, one set adapted to co-operate with said lever and the other set with said blade, and means on said spring-pressed mechanism for bringing said lever in the path of the pins co-operating therewith when said spring-pressed mechanism moves into a notch in said transporting mechanism not containing a cap, whereby said blade is interposed between the said tube and said transporting mechanism during the next movement of the latter, said blade mechanism being thereby brought into the path of the pins co-operating therewith, said last-mentioned pins shifting said blade mechanism and said lever away from said tube during the next movement of said transporting mechanism.

3. In a machine for the manufacture of bottle closures of the cap variety, the combination with a rotary drum having radial passages adapted to receive closures, a star wheel having arms adapted to be projected into said passages to disengage the closures therefrom, said drum being provided with a plurality of equidistantly disposed notches, and lugs on said star wheel adapted to mesh with said notches, whereby said star wheel is rotated in the rotation of said drum.

Signed at New York, in the county of Kings and State of New York, this 20th day of January, A. D. 1925.

JOHN BINDER.